United States Patent
Fang et al.

(10) Patent No.: US 7,057,777 B2
(45) Date of Patent: Jun. 6, 2006

(54) OPTICAL IMAGE SCANNING DEVICE WITH FLUORESCENT LAYER AS BACK LIGHT

(76) Inventors: Po-Hua Fang, No. 1-1, R&D Rd., Science-based Industrial Park, Hsinchu (TW); Hsiu-O Hsu, No. 1-1, R&D Rd., Science-based Industrial Park, Hsinchu (TW)

(*) Notice: Subject to any disclaimer, the term of this patent is extended or adjusted under 35 U.S.C. 154(b) by 840 days.

(21) Appl. No.: 10/144,697

(22) Filed: May 15, 2002

(65) Prior Publication Data
US 2003/0123110 A1 Jul. 3, 2003

(30) Foreign Application Priority Data
Dec. 31, 2001 (TW) ............... 90224045 U

(51) Int. Cl.
*H04N 1/04* (2006.01)
*G01D 11/28* (2006.01)
*G03B 27/54* (2006.01)
*G03G 15/00* (2006.01)

(52) U.S. Cl. ............... 358/475; 358/474; 358/497; 358/487; 358/506; 362/30; 355/67; 399/380

(58) Field of Classification Search ............... 358/475, 358/474, 497, 487, 506; 362/30; 355/67; 399/380
See application file for complete search history.

(56) References Cited
U.S. PATENT DOCUMENTS
5,128,846 A * 7/1992 Mills et al. ............... 362/224

* cited by examiner

*Primary Examiner*—Edward Coles
*Assistant Examiner*—Houshang Safaipour
(74) *Attorney, Agent, or Firm*—Berkeley Law & Technology Group

(57) ABSTRACT

An optical image scanning device includes a casing having a document supporting plate and a top cover. The top cover has an underside surface coated with a fluorescent material thereon. An optic module includes a light source for projecting an exciting light onto the fluorescent layer whereby the fluorescent material is excited by the exciting light to emit a scanning light. The scanning light transmits through a light-transmittable document and projects an image of the document onto reflective mirrors for guiding the scanning light through a focusing lens. The focusing lens focuses the light onto a image sensing device. A reflective type light source is selectively arranged in the optic module for selectively projecting a light onto a document formed on a non-transmissive medium that is positioned on the document supporting plate.

12 Claims, 9 Drawing Sheets

OPTICAL IMAGE SCANNING DEVICE WITH FLUORESCENT LAYER AS BACK LIGHT

BACKGROUND OF THE INVENTION

1. Field of the Invention

The present invention relates generally to a document scanner having a back light for scanning a transmissive document, and in particular to a scanner having a layer of fluorescent material on the back side of the transmissive document to generate a back light.

2. Description of the Prior Art

A scanner is widely used in office automation to scan pictures, documents, and many other images. The document scanners are generally categorized as (1) reflective type for scanning documents printed on non-transmissive media and (2) transmissive type for scanning documents printed on transmissive media.

FIG. 1 of the attached drawings shows a typical reflective type document scanner, which comprises a casing 1 having a top wall 11 mounted with a light-transmittable document supporting plate 12 for supporting a reflective type document 10 to be scanned. A top cover 13 is pivoted to the casing 1 for covering the document 10 positioned on the light-transmittable document supporting plate 12. A light-blocking layer 131, which is often white, is formed on an underside surface of the top cover 13.

Also referring to FIG. 2, the conventional reflective type scanner comprises an optic module 14, which comprises a light source 16 projecting a scanning light toward the document 10 and a number of reflective mirrors 171–174 which form a light path for the reflected scanning light. A focusing lens 18 focuses the reflected light to an image sensing unit 19, such as a Charge Coupling Device (CCD) whereby the image printed on the document 10 is read by the image sensing unit 19. The optic module 14 is movable in direction I along a pair of rails 15a, 15b fixed inside the casing 1 for scanning the whole surface of the document 10.

FIG. 3 of the attached drawings shows a typical transmissive scanner, which comprises a casing 2 having a top wall 21 provided with a light-transmittable document supporting plate 22 for supporting a transmissive document 20 thereon. A back light module 23 is pivotally mounted on the casing 2. With reference to FIG. 4, a back light source 26 is arranged in the back light module 23 and a light-transmittable window 231 is formed on an underside surface of the back light module 23. The back light source 26 projects a scanning light, via the light-transmittable window 231, through the transmissive document 20.

The conventional transmissive scanner also comprises an optic module 24 arranged inside the casing 2. The optic module 24 comprises a number of reflective mirrors 271, 272, 273 for guiding the scanning light that transmits through the transmissive document 20 toward a focusing lens 28. The focusing lens 28 focuses the scanning light onto an image sensing unit 29, such as a Charge Coupling Device. The optic module 24 is movable in direction I along rails 25a, 25b for scanning the whole surface of the transmissive document 20.

The conventional scanners as described above can only perform scanning operation on either the transmissive documents or non-transmissive documents. Heretofore, no scanner is capable to perform scanning operation on both transmissive and non-transmissive documents. Although it is obvious to those having ordinary skills to provide a back light module to a reflective type scanner for performing a transmissive type scanning operation, the addition of the back light module inevitably increases the overall size of the reflective type scanner. Furthermore, in performing the transmissive type scanning operation, the back light source must move in synchronization with the optic module. This complicates the structure and mechanism of the scanner.

It is thus desired to provide a document scanner for overcoming the above problems.

SUMMARY OF THE INVENTION

A primary object of the present invention is to provide a document scanner having a layer of fluorescent material formed on an underside surface of a top cover of the document scanner.

Another object of the present invention is to provide a document scanner that is capable to perform both reflective type and transmissive type scanning operations.

A further object of the present invention is to provide a document scanner that is capable to perform a transmissive type scanning operation without a back light module arranged on the casing of the document scanner.

A further object of the present invention is to provide a document scanner that is capable to perform a transmissive type scanning operation without moving a back light source.

To achieve the above objects, in accordance with the present invention, there is provided a document scanner comprising a casing having a light-transmittable document supporting plate and a top cover movably mounted to the casing for removably covering the light-transmittable document supporting plate. The top cover has an underside surface on which a layer of fluorescent material is formed. An optic module is arranged inside the casing, comprising a light source for projecting an exciting light onto the fluorescent layer whereby the fluorescent material of the layer is excited by the exciting light to emit a scanning light. The scanning light transmits through a document formed on a transmissive medium that is positioned on the document supporting plate and projecting an image of the document onto reflective mirrors that are arranged inside the casing for guiding the scanning light through a focusing lens. The focusing lens focuses the light onto a charge coupling device for reading the image. An additional light source is selectively arranged in the optic module for selectively projecting a light onto a document formed on a non-transmissive medium that is positioned on the document supporting plate. The light is reflected by the non-transmissive medium for projecting an image of the document onto the reflective mirrors which guide the light toward the focusing lens for focusing the image onto the charge coupling device.

BRIEF DESCRIPTION OF THE DRAWINGS

The present invention will be apparent to those skilled in the art by reading the following description of preferred embodiments thereof, with reference to the attached drawings, in which.

DETAILED DESCRIPTION OF THE PREFERRED EMBODIMENTS

Figure 1:
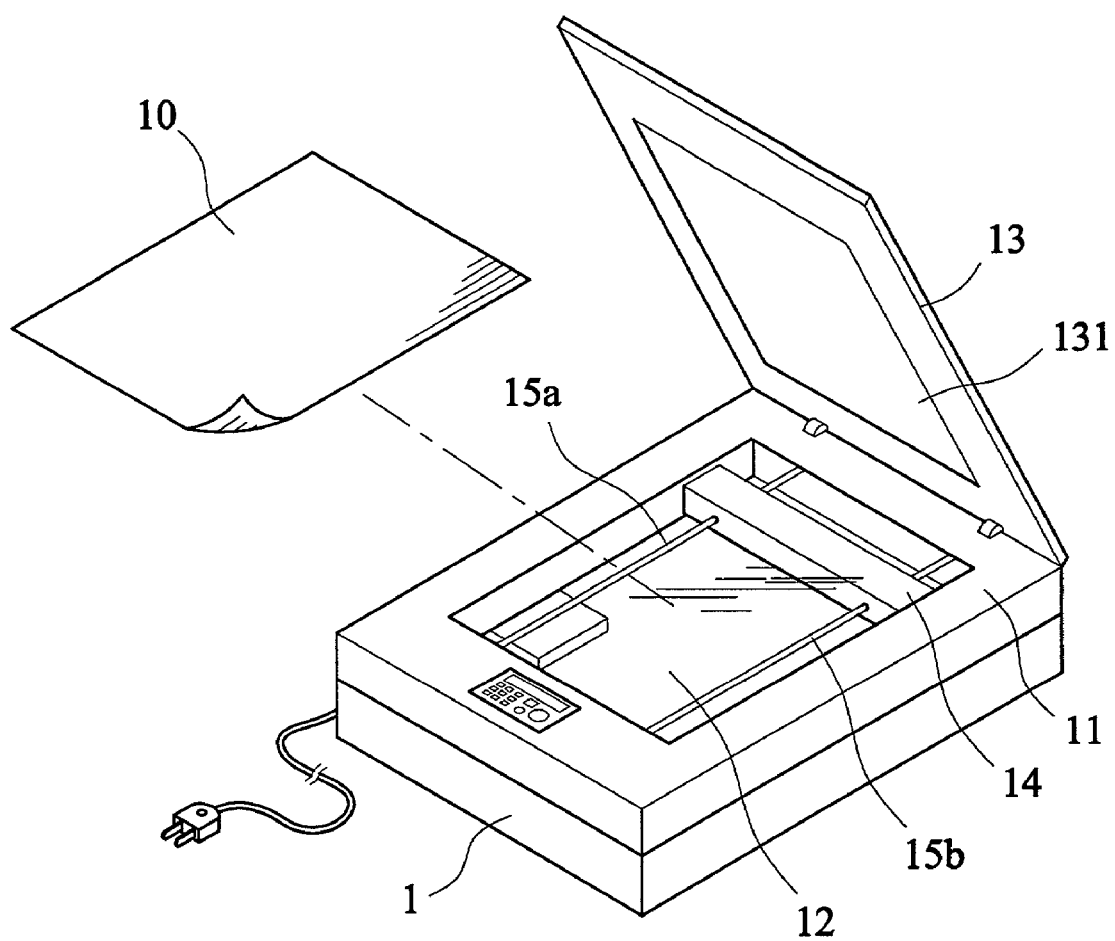
FIG. 1 is a perspective view of a conventional reflective type document scanner.
Figure 2:
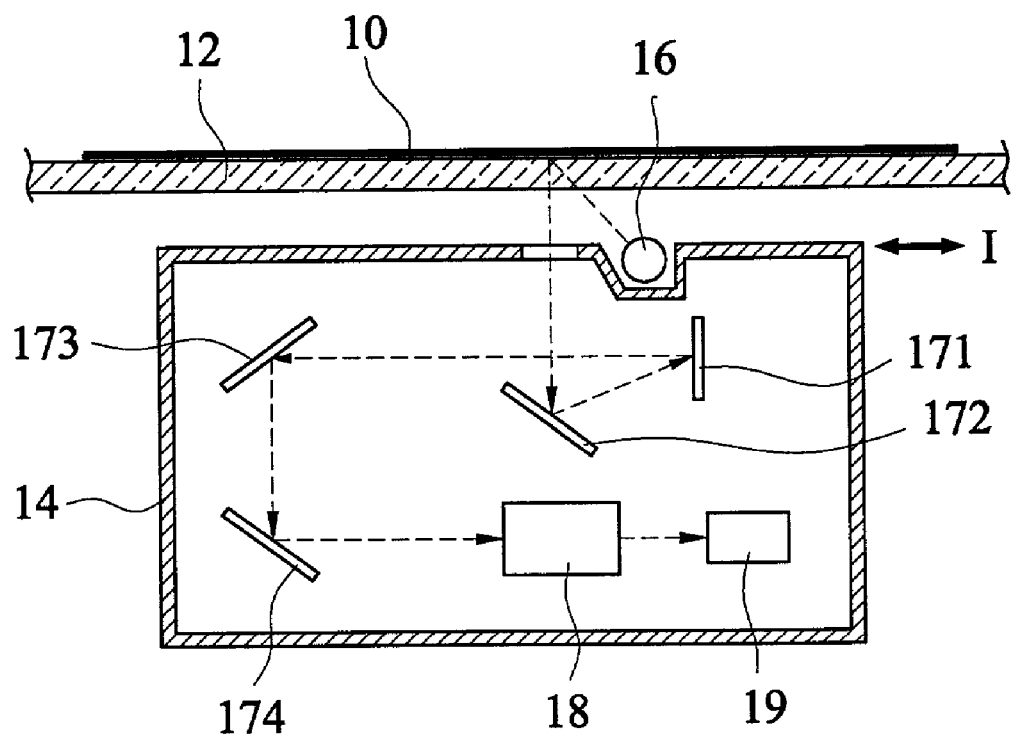
FIG. 2 is a cross-sectional view showing an optical path established by a conventional reflective type document scanner.
Figure 3:
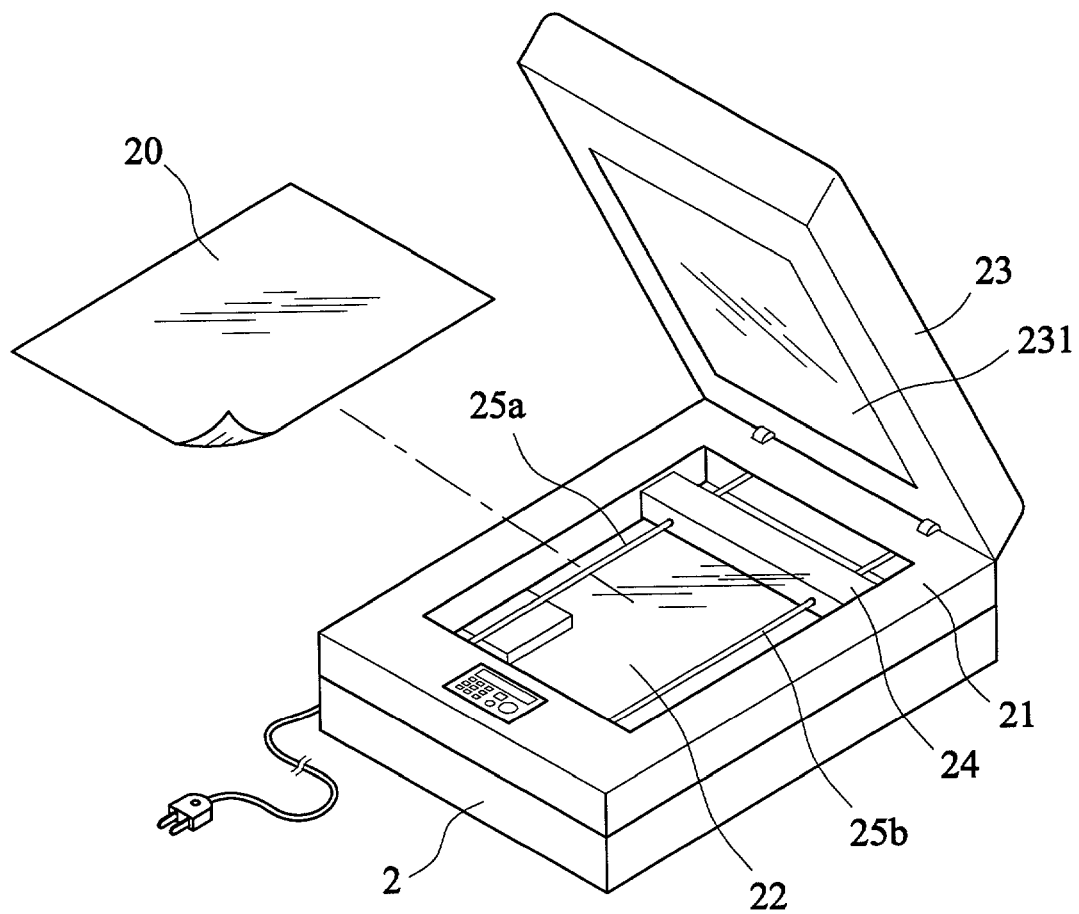
FIG. 3 is a perspective view of a conventional transmissive type document scanner.
Figure 4:
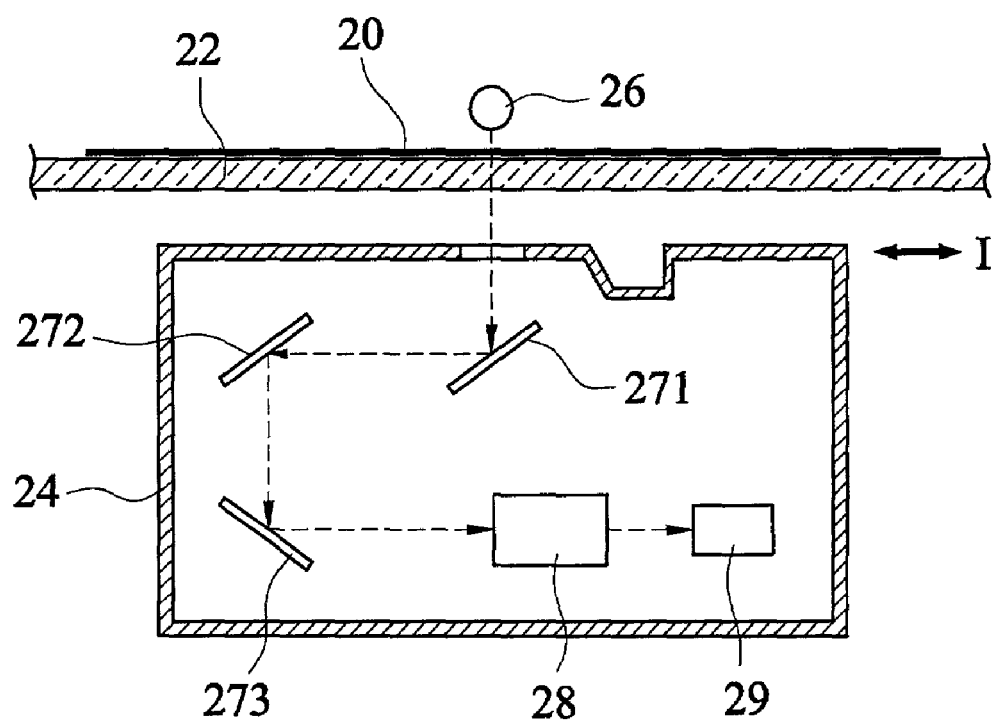
FIG. 4 is a cross-sectional view showing an optical path established by a conventional transmissive type document scanner.
Figure 5:
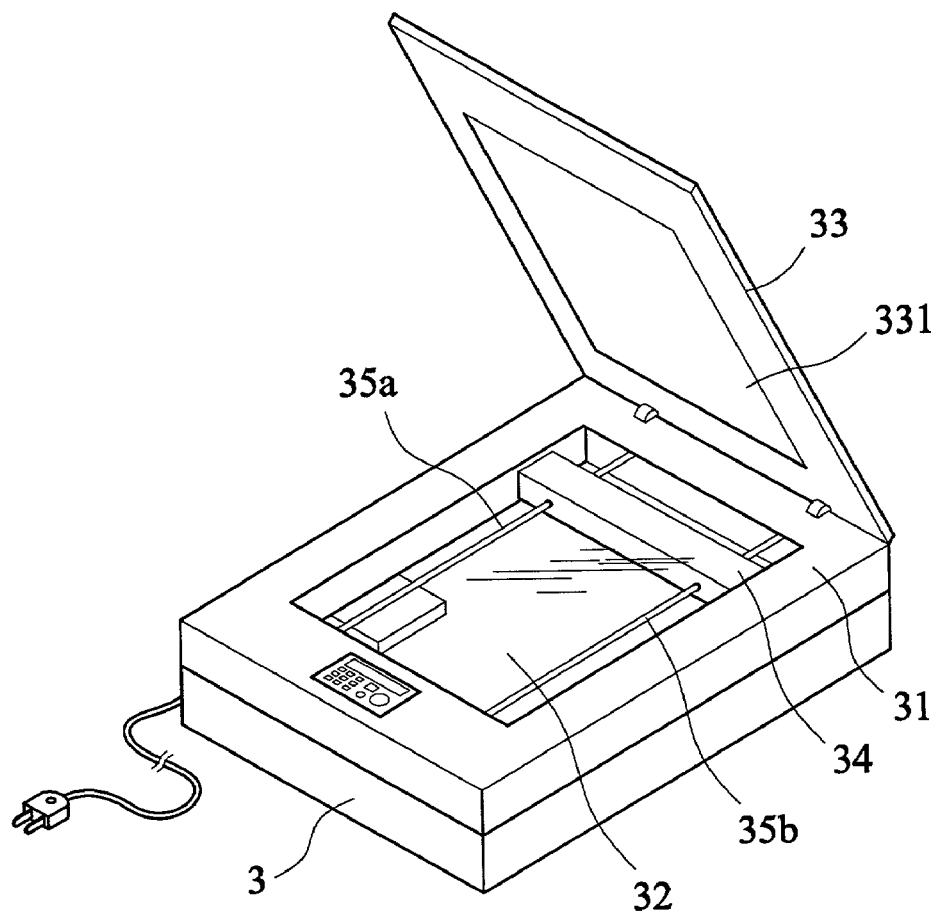
FIG. 5 is a perspective view of a document scanner constructed in accordance with the present invention.

With reference to the drawings and in particular to FIG. 5, a document scanner constructed in accordance with the present invention comprises a casing 3 having a top wall 31 forming a light-transmittable document supporting plate 32 for supporting a document to be scanned. A top cover 33 is pivotally mounted on the casing 3 for covering the document supporting plate 32 and the document positioned thereon during a scanning operation.

Figure 6:
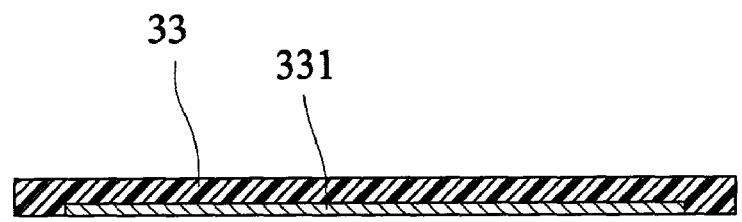
FIG. 6 is a cross-sectional view of a top cover of the document scanner of the present invention.

Also referring to FIG. 6, the top cover 33 has an underside surface that faces the document supporting plate 32 of the casing 3. A layer of fluorescent material 331 is formed on the underside surface of the top cover 33.

Figure 7:
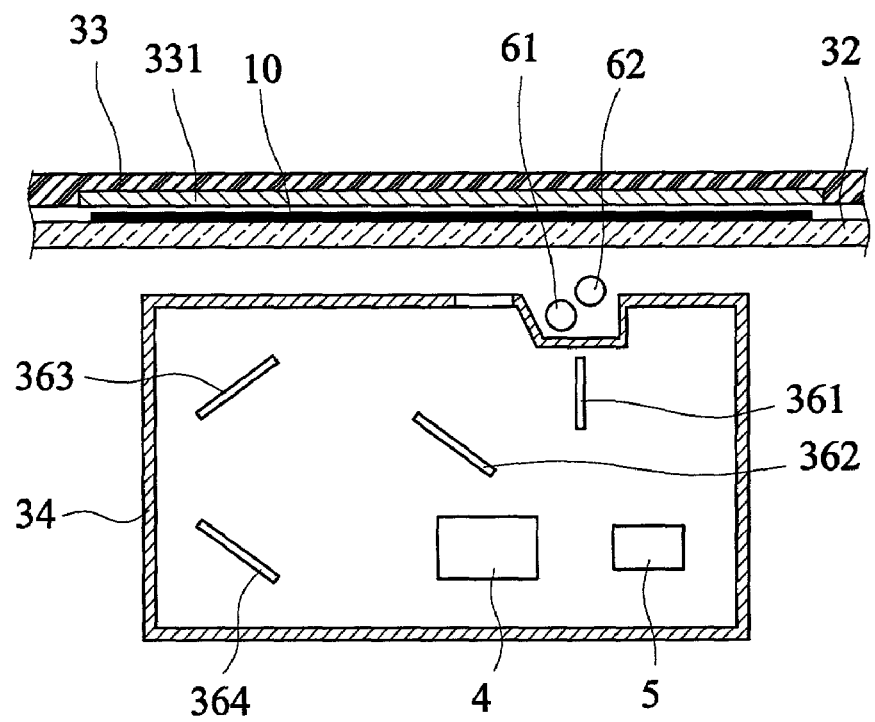
FIG. 7 a schematic cross-sectional view showing an optic module is arranged under a document supporting plate of the document scanner of the present invention.

Also referring to FIG. 7, the document scanner comprises an optic module 34 movably arranged inside the casing 3. The optic module 34 comprises a number of reflective mirrors 361–364 for guiding a scanning light that is either reflected from a reflective document 10 or transmitting through a transmissive document 20 toward a focusing lens 4. The focusing lens 4 focuses the light onto an image sensing device 5, such as a Charge Coupling Device. The optic module 34 is movable in direction I (FIGS. 8 and 9) along guiding rods 35*a*, 35*b*.

The document scanner comprises a first light source 61 for reflective type scanning operation and a second light source 62 for exciting the fluorescent material 331 to emit back light for transmissive type scanning operation.

The second light source 62 generates and projects an exciting light 62*a* toward the fluorescent layer 331 coated on the underside surface of the top cover 33. The fluorescent material of the layer 331 is excited by the exciting light 62*a* from the second light source 62 and generates a scanning light 62*b*. Since the whole layer 331 of the fluorescent material can be completely excited by the exciting light 62*a*, no movement of the back light source that is required in the conventional transmissive type scanning operation is needed in the present invention.

The second light source 62 for example comprises an ultraviolet light generator capable of emitting an ultraviolet light having a wavelength of 250–260 nm. An ultraviolet light having a wavelength 360–370 nm can also be adapted in the present invention. In the embodiment illustrated, the fluorescent material that makes the layer 331 comprises Halo Calcium Phosphate or rear earth based fluorescent materials.

An example of the ultraviolet light generator is an ultraviolet light emitting diode (UV-LED) giving off ultraviolet light of a wavelength of 360–400 nm. The fluorescent material of the layer 331 is selected from the materials that, after being excited by the ultraviolet light, gives off blue, green, orange or red light which can be combined to generate white light. An example of the fluorescent material that gives off blue light is ZnS:Ag,Ga,Cl. An example of the fluorescent material that gives off green light is ZnCdS:Cu, Al. An example of the fluorescent material that gives off orange light is ZnS:Mn. An example of the fluorescent material that gives off red light is $Y_2O_3$:Eu. In this respect, it is obvious that the layer 331 may include a number of different fluorescent materials for giving off lights of different colors.

In a different embodiment, the second light source 62 comprises a blue light generator that gives off a blue light of wavelength 460–480 nm. An example of the blue light generator is a blue light LED comprised of InGaN. Corresponding to the blue light of 460–480 nm emitted by the blue light LED, the fluorescent layer 331 is made of a fluorescent material that gives off a yellow light. An example of the fluorescent material is Yttrium Aluminum Garnet (YAG, $Y_3Al_5O_{12}$) that gives off a yellow light of wavelength 555 nm. By combination of the blue light and the yellow light, a while light source can be formed on the back side of the document 20.

Figure 8:
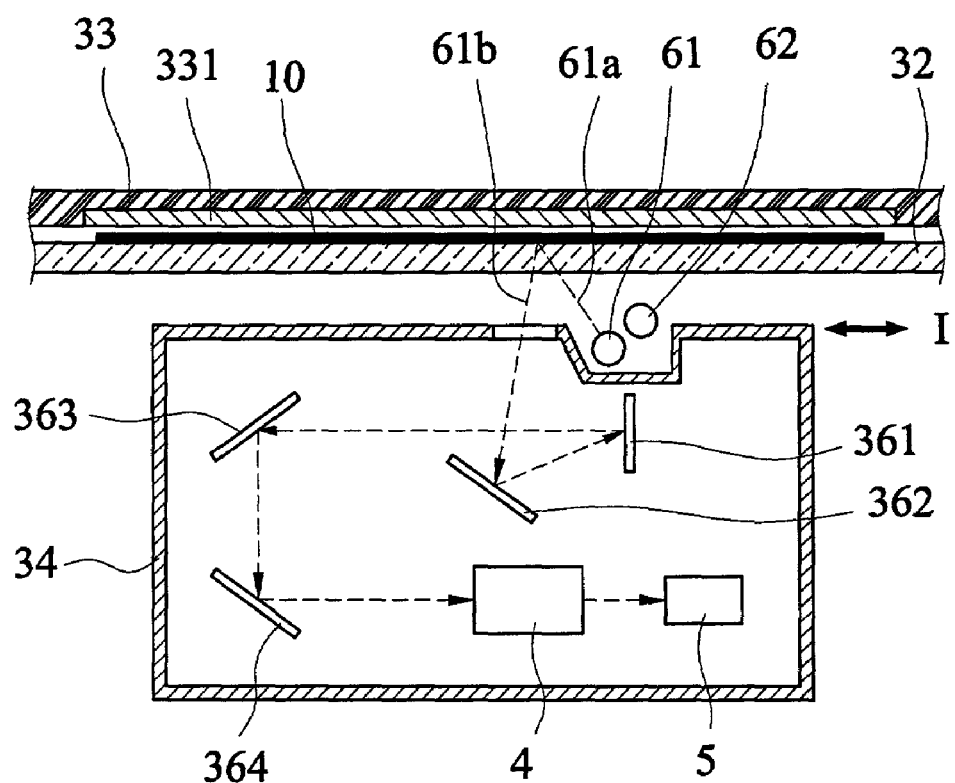
FIG. 8 is a schematic cross-sectional view showing an optical path established by the document scanner of the present invention operated in a reflective type scanning mode.

As shown in FIG. 8, in scanning a reflective type document 10 which has an image printed on a non-transmissive medium, the reflective document 10 is positioned on the document supporting plate 32. The first light source 61 projects a scanning light 61*a* onto the document 10 via the light-transmittable document supporting plate 32. The scanning light 61*a* is reflected by the non-transmissive medium of the document 10 to form a reflected light 61*b*. The reflected light 61*b* is further reflected by the reflective mirrors 361–364 toward the focusing lens 4 which in turn focuses the light onto the image sensing device 5.

Figure 9:
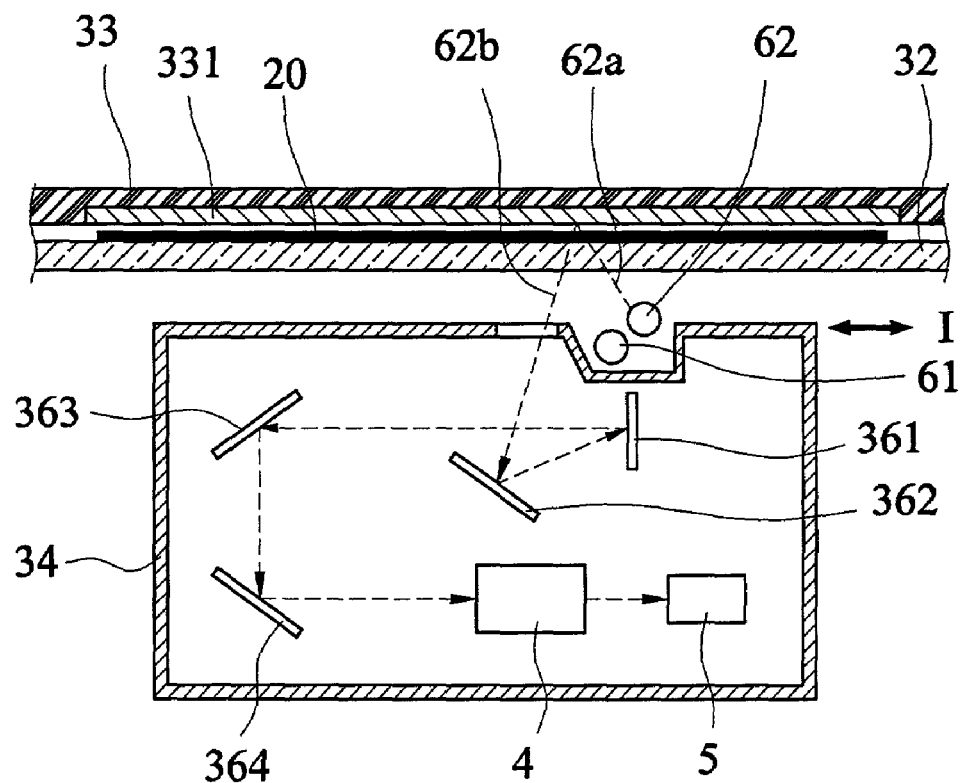
FIG. 9 is a schematic cross-sectional view similar to FIG. 8 but showing the document scanner of the present invention is operated in a transmissive type scanning mode.

In scanning a transmissive type document 20, as shown in FIG. 9, the transmissive document 20 that has an image formed on a transmissive medium is positioned on the document supporting plate 32. The second light source 62 projects an exciting light 62*a* onto the fluorescent layer 331 of the top cover 33 which in turn emits a scanning light 62*b* transmitting through the transmissive medium of the document 20 and the document supporting plate 32. The exciting light 62*b* is reflected by the reflective mirrors 361–364 toward the focusing lens 4 and focused by the focusing lens 4 onto the image sensing device 5.

Figure 10:
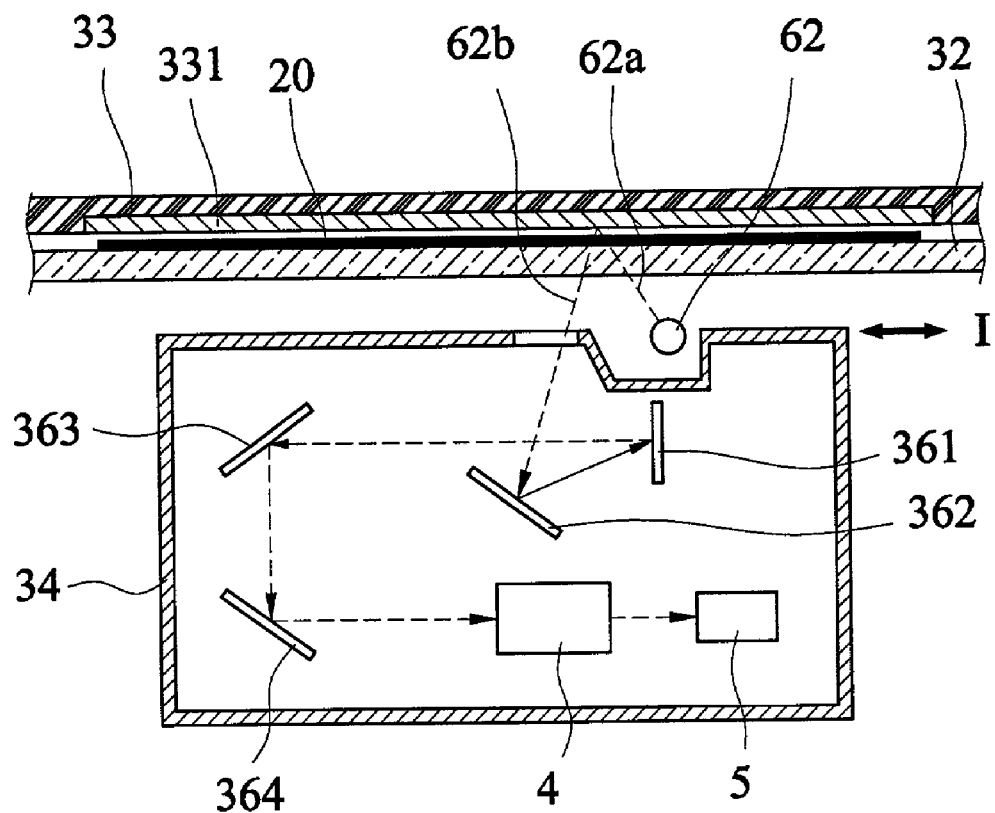
FIG. 10 is a schematic cross-sectional view showing an optical path established by the document scanner in accordance with another embodiment of the present invention operated in a transmissive type scanning mode.

FIG. 10 shows a different embodiment of the scanner constructed in accordance with the present invention. The scanner of the second embodiment is substantially identical to that of the first embodiment whereby identical parts of the scanners of the first and second embodiments are designated with the same reference numerals for simplicity. It is noted that in the second embodiment, the first light source 61 for projecting a scanning light to scan a reflective type document is omitted. Only a second light source 62 is provided on the optic module 34.

In scanning a transmissive type document 20, the transmissive document 20 is positioned on the document supporting plate 32. The second light source 62 projects an exciting light 62*a* onto the fluorescent layer 331 of the top cover 33 which in turn emits a scanning light 62*b* transmitting through the transmissive medium of the document 20 and the document supporting plate 32. The exciting light 62*b* is reflected by the reflective mirrors 361–364 toward the focusing lens 4 and focused by the focusing lens 4 onto the image sensing device 5.

Although the present invention has been described with reference to the preferred embodiments thereof, it is apparent to those skilled in the art that a variety of modifications and changes may be made without departing from the scope of the present invention which is intended to be defined by the appended claims.

We claim:

1. An optical image scanning device comprising:
   a casing having a light-transmittable document supporting plate;
   a top cover movably mounted to the casing for removably covering the document supporting plate, the top cover having an underside surface facing the document supporting plate, a layer of fluorescent material being formed on the underside surface of the top cover; and
   an optic module arranged inside the casing, the optic module comprising a light source for projecting an exciting light onto the fluorescent layer whereby the fluorescent material of the layer is excited by the exciting light to emit a scanning light, and an image sensing unit for receiving the scanning light;
   when a light-transmittable document comprising image formed thereon is positioned on the document supporting plate, the exciting light generated by the light source and projected onto the fluorescent layer causes the fluorescent material to emit the scanning light transmitting through the light-transmittable document and thus projecting the image onto the image sensing unit.

2. The optical image scanning device as claimed in claim 1, wherein the light source comprises an ultraviolet light generator to generate an ultraviolet light as the exciting light and wherein the fluorescent material is excited by the ultraviolet light to emit the scanning light.

3. The optical image scanning device as claimed in claim 2, wherein the ultraviolet light generated by the light source has a wavelength of 250–260 nm.

4. The optical image scanning device as claimed in claim 2, wherein the ultraviolet light generated by the light source has a wavelength of 360–370 nm.

5. The optical image scanning device as claimed in claim 2, wherein the ultraviolet light generator comprises at least one ultraviolet light emitting diode emitting an ultraviolet light having a wavelength of 370–400 nm.

6. The optical image scanning device as claimed in claim 2, wherein the fluorescent material comprises Halo Calcium Phosphate.

7. The optical Image Scanning Device as claimed in claim 2, wherein the fluorescent material comprises rear earth based fluorescent materials.

8. The optical image scanning device as claimed in claim 2, wherein the fluorescent material is excited by the ultraviolet light generated by the ultraviolet light generator to emit a light source comprising a blue light, a green light, an orange light, and a red light, the light source being further mixed to form a white light.

9. The optical image scanning device as claimed in claim 1, wherein the light source comprises a light generator that generates a blue light, the blue light being projected to the fluorescent layer to cause the fluorescent material to emit a yellow light whereby a white light is formed by combination thereof.

10. The optical image scanning device as claimed in claim 9, wherein the light generator that generates a blue light comprises at least one InGaN based blue light emitting diode, the blue light generated by the blue light emitting diode having a wavelength of 460–480 nm.

11. The optical image scanning device as claimed in claim 9, wherein the fluorescent material comprises Yttrium Aluminum Garnet that generates a yellow light of wavelength 555 nm.

12. The optical image scanning device as claimed in claim 1, further comprising a reflective type light source mounted on the optic module for projecting a light onto a document formed on a non-transmissive medium, the light being reflected by the document and received by the image sensing unit.

* * * * *

UNITED STATES PATENT AND TRADEMARK OFFICE
CERTIFICATE OF CORRECTION

| | |
|---|---|
| PATENT NO. | : 7,057,777 B2 |
| APPLICATION NO. | : 10/144697 |
| DATED | : June 6, 2006 |
| INVENTOR(S) | : Fang et al. |

It is certified that error appears in the above-identified patent and that said Letters Patent is hereby corrected as shown below:

At column 4, line 26, please replace "a while light" with --a white light--.

Signed and Sealed this

Seventh Day of April, 2009

JOHN DOLL
*Acting Director of the United States Patent and Trademark Office*